United States Patent Office 3,355,261
Patented Nov. 28, 1967

3,355,261
CHEMICAL PROCESS
Henry C. Miller, Wilmington, Del., and Earl L. Muetterties, West Chester, Pa., assignors to E. I. du Pont de Nemours and Company, Wilmington, Del., a corporation of Delaware
No Drawing. Filed Apr. 29, 1963, Ser. No. 276,652
12 Claims. (Cl. 23—362)

This invention relates to an improved process for preparing dodecahydrododecaborates. More specifically, it concerns an improved process for preparing alkali metal and alkaline earth metal dodecahydrododecaborates.

Dodecahydrododecaborates (2−) are salts of the $B_{12}H_{12}^{-2}$ anion which have been discovered only recently. The divalent anion is a polyhedral boron hydride which possesses unusual and unexpected stability. It undergoes many substitution reactions and is a versatile intermediate for the preparation of novel boron-containing products. Investigation and development of compounds containing the $B_{12}H_{12}^{-2}$ anion will be advanced by attractive processes for their preparation, particularly, processes which lead to good yields of products by economical routes.

In our copending U.S. Patent 3,328,134 it is shown that polyhydropolyborates having three or more boron atoms, including dodecahydrododecaborates, can be prepared by reacting diborane with an alkali metal or alkaline earth metal tetrahydroborate under at least 3 atmospheres pressure. We have now found a process whereby diborane and a tetrahydroborate can be reacted under selected conditions which do not require superatmospheric pressures to obtain dodecahydrododecaborates as the principal product in good yield.

Thus, it is an object of this invention to provide a process for the preparation of dodecahydrododecaborates which can be carried out at atmospheric pressure. It is another object to provide a process for the preparation of the above borates which will result in improved yields of said borates. Still other objects will become apparent from the following description.

The process of the invention comprises the preparation of alkali metal or alkaline earth metal dodecahydrododecaborates in a single step by reacting diborane with an alkali metal or alkaline earth metal tetrahydroborate at a temperature of at least 120° C. in the presence of a Lewis base which forms an adduct with diborane. The reaction proceeds at prevailing atmospheric pressures and thus no pressure equipment is needed. The reaction, preferably, is conducted in the substantial absence of oxygen (air) and moisture.

The essential components in the process are diborane, a tetrahydroborate and a Lewis base. These reactants are defined more fully in the paragraphs immediately following.

The tetrahydroborate reactant is a compound of the formula (1)     $M(BH_4)_n$ 

where M is an alkali metal or alkaline earth metal, and n is a positive whole number equal to the valence of M, i.e., n is 1 or 2. When M is an alkali metal, n has a value of 1; when M is an alkaline earth metal, n has a value of 2. Alkali metals and alkaline earth metals are elements of atomic numbers 3–56, inclusive, of Groups I-A and II-A of the Periodic Table. Thus, M in Formula 1 can be, e.g., lithium, sodium, potassium, rubidium, cesium, beryllium, magnesium, calcium, strontium and barium. Because of ready availability, sodium and potassium tetrahydroborates constitute a preferred group.

The Lewis base reactants are those of the following formulas:

(2)     $RO(CH_2CH_2O)_mR'$
(3)     $R'SR''$
(4)     $RR'R''N$ and (5)     $RR'R''P$ where R, R' and R'' are alkyl or cycloalkyl groups of up to 12 carbons and where R' and R'' can be bonded together to form a divalent hydrocarbon radical which forms a ring with the sulfur, nitrogen or phosphorous; m is a positive number of at least 2, i.e., m can be 2 or more, preferably m does not exceed 6. Tertiary amines of Formula 4 and polyethers of Formula 2 are particularly valuable for use in the process. The polyethers of Formula 2 may be viewed as alkoxy derivatives of glycol polyethers obtained from ethylene oxide.

Examples of the Lewis base reactant include those in which the hydrocarbyl groups (R, R' and R'') can be, for example, methyl, ethyl, propyl, isopropyl, butyl, isobutyl, octyl, 2-ethylhexyl, dodecyl, cyclopentyl, cyclohexyl, and the like. Specific examples of Lewis bases include, among others, methyl cyclohexyl sulfide, N,N-dimethylcyclohexylamine, N-methylpentamethyleneimine, N-methylpyrrolidine, cyclohexyldiethylphosphine, pentamethylene sulfide, and the like.

The diborane reactant is the compound having the formula $B_2T_6$.

The reactants employed in the reaction are, in general, commercial grade materials. It is preferable the reactants be free of adventitious moisture in order to obtain higher yields, but in general, the commercial grade materials may be used without special purification.

For operation of the process of the invention, it is not essential that the reactants be charged into the vessel in any stated sequence. Whatever the sequence, the Lewis bases from adducts with the diborane. These adducts can be represented by the Formula 6 $BH_3$–Z (in which Z is the Lewis base defined previously) and serve as reservoirs of diborane at the temperature of the reaction.

The role of the Lewis base, as an essential component, may be explained by describing the formation of the adducts. The diborane ($B_2H_6$) behaves in many respects as if it were two loosely connected $BH_3$ groups, which can be fragmented to form $BH_3$. The incomplete electron octet around the boron atom has a strong tendency to accept electrons and will form a coordination compound with an electron donor, and the Lewis bases, being electron donors, will combine reversibly with diborane to form the adducts. The formation of these adducts of $B_2H_6$ has been studied extensively in the literature and their properties are well-established. References which discuss these reversible combinations are:

Stone, Quarterly Reviews, 1955, 174–201 (particularly p. 184).

Sidgwick, "Chemical Elements and Their Compounds," vol. 1, p. 351 ff., Oxford University Press (1950).

Moeller, "Inorganic Chemistry," p. 780, John Wiley & Sons, Inc. (1942).

In addition, the Lewis base may aid, in some cases, in formation of a loose combination, not only with diborane, but with the tetrahydroborate and thus provide close reactive contact between the boron-containing reactants. However, the Lewis base does not enter into or form a part of the final product.

The adducts may be prepared outside the reaction zone and supplied in this preformed condition to the reaction zone. They may be prepared by simple mixing at any convenient temperature, e.g., −100° C. or lower or at higher temperature, e.g., 50° C. The mixing temperature is not critical.

It is most convenient to prepare the adduct in the reaction zone, but however prepared, they are considered to be within the scope of the definition of the essential components of the reaction.

In general, a conventional vessel may be employed which, preferably, is lined with a corrosion-resistant material (e.g., stainless steel, platinum, glass, and the like). The vessel is preferably fitted with a gas inlet tube and a reflux condenser. The vessel is charged with the Lewis base and the tetrahydroborate of Formula 1, and an inert gas is passed into the vessel to remove adventitious moisture and to provide a non-oxidizing atmosphere. Suitable inert gases are nitrogen, argon, helium, and the like. Diborane is now passed into the reaction mixture, preferably by bubbling through the mixture to provide intimate contact between the reactants.

Alternatively, the Lewis base can be charged into the vessel initially and diborane passed into contact with the base to form an adduct. The tetrahydroborate can then be charged into the vessel. The reaction mixture can be stirred, if desired, during operation of the process by any suitable method, e.g., shaking or mechanical stirring.

The mole ratio in which the reactants are present is not critical. The diborane can be bubbled through slowly or rapidly and it is necessary only to have diborane present in sufficient quantity at any time to react with the tetrahydroborate. Moreover, the adducts formed from the Lewis base and diborane may boil at a temperature above the operating temperatures.

Heat is then applied slowly to the reaction vessel and the temperature of the reaction mixture is raised to a point where release of hydrogen gas begins. Heating may be continued to a higher temperature or it may be adjusted to maintain the temperature at a point at which a steady and controllable evolution of hydrogen takes place. When evolution of hydrogen ceases and is not renewed even with further heating, the reaction is complete and the flow of diborane is, therefore, stopped. The reaction mixture is cooled and processed by conventional procedures.

The process is generally operated at a temperature of at least 120° C. to permit release of free hydrogen and to obtain dodecahydrododecaborates as the principal product. Higher temperatures can be employed, for example, up to 400° C. or even higher, if desired, but excessively high temperatures offer no advantage. A convenient method of operation is simply to heat the reaction mixture to the temperature at which hydrogen is released and to maintain heating until no further release of hydrogen occurs. The preferred temperature range of operation is 120°–300° C.

The length of the reaction period is not critical. In a batch operation, release of hydrogen is generally rapid at the operating temperature. The mixture can be stirred mechanically to speed the reaction, or diborane can be introduced into the mixture through an inlet tube equipped with a porous plate to produce very small bubbles which provide a large surface area for reaction. Measurable amounts of the dodecahydrododecaborate salt are present in the reaction mixture within a short time after diborane is introduced, e.g., within one or two minutes. To obtain maximum yield of product, the reaction is preferably continued until no further release of hydrogen is noted but it is not essential for operability to conduct the process for this period of time.

The reaction proceeds readily at prevailing atmospheric pressure and this method of operation has obvious advantages of low cost and ease of manipulation. Pressure is not a critical variable for operability and fluctuations in pressure may occur during operations without affecting the process adversely. Similarly, the time of reaction is not critical.

The process can be operated by batch or continuous methods, and procedures for these methods are well known in the engineering field.

Because diborane reacts readily with moisture and with oxygen, it is desirable to exclude these materials from the reaction zone.

Volatile by-products of the process can be collected in traps cooled, e.g., with liquid nitrogen, liquid helium and the like, although it is not essential to do so. However, since free hydrogen is obtained as a by-product, it is desirable to provide means for the safe disposition of the hydrogen. The formation of free hydrogen is a characteristic feature of the reaction, and the progress of the reaction can be followed, if desired, by measuring the amount of hydrogen which is released.

The principal product which is obtained directly in the reaction is a dodecahydrododecaborate of the formula (7)  $M_aB_{12}H_{12}$ where M is an alkali metal or alkaline earth metal as defined in Formula 1, and $a$ is a positive whole number which is equal to 2 divided by the valence of M, i.e., $a$ is 2 when M is an alkali metal, and $a$ is 1 when M is an alkaline earth metal. The objective of the process of this invention is the preparation of compounds of Formula 7.

The reaction product identified by Formula 7 is a salt which can be isolated directly from the reaction mixture by conventional methods, e.g., filtration, evaporation, crystallization, washing with non-solvents, and the like.

The dodecahydrododecaborate product may be isolated and purified by dissolving the alkali metal or alkaline earth metal salt in hydroxylated solvents or in ethers, e.g., water, alcohols, aqueous dioxane, aqueous 1,2-dimethoxyethane, and the like, followed by addition of a salt which has a cation of large atomic volume. Dodecahydrododecaborate salts of these cations have low solubility and can, therefore, be purified easily by one or more crystallizations. Examples of salts and bases with large cations which can be used to precipitate the dodecahydrododecaborates are quaternary ammonium salts and hydroxides [$(CH_3)_4NCl$, $(C_2H_5)_4NOH$], cesium salts and hydroxide ($CsBr$, $CsOH$), thallium salts and hydroxide ($TlNO_3$, $TlOH$), sulfonium salts and bases

[$(CH_3)_3SCl$, $(C_2H_5)_3SOH$]

phosphonium salts

[$(CH_4H_9)_4PBr$, $(C_2H_5)_3PCH_2CH_2P(C_2H_5)_3Cl_2$]

metal-ammine halides [$Zn(NH_3)_4Cl_2$, $Co(NH_3)_6Cl_2$] and related types of compounds.

The methods of isolation and purification are evident from the disclosure in the examples which illustrate the process of the invention.

The operation of the process of the invention is illustrated, but is not limited, by the examples which follow:

*Example 1*

(A) Triethylamine and diborane are contacted in a cooled reaction vessel under a blanket of nitrogen in sufficient quantities to provide 25 ml. of triethylamineborane adduct. The liquid adduct, under nitrogen gas, is stirred and 2.0 g. of $NaBH_4$ is added to form a slurry. Stirring is continued and $B_2H_6$ is bubbled through the mixture at a rate of about 1 g./hr. The mixture is heated slowly to 80° C. and no reaction is observed. At this point the $NaBH_4$ can be recovered unchanged. Heating is continued to 120° C. where evolution of hydrogen begins. After three hours at this temperature (i.e., 120° C.) the mixture is cooled and filtered to separate the solid product. A total quantity of 2.7 g. of crude product is obtained which is extracted with tetrahydrofuran. The insoluble portion (1.7 g.) is unreacted $NaBH_4$. The tetrahydrofuran extract is diluted with glyme and a white precipitate forms which is separated to obtain 2.3 g. of $Na_2B_{12}H_{12}$ containing glyme as solvent of crystallization.

(B) The process of Part A is repeated with the exception that diborane is bubbled through the reaction mixture at 190° C. for 1 hour and 45 minutes. The reaction mixture is processed as described in Part A to obtain 6.0 g. of $Na_2B_{12}H_{12}$ containing glyme as solvent of crystallization. No unreacted $NaBH_4$ is recovered.

Example 1 illustrates generically operation of the process employing a compound of Formula 4 as one component of the reaction mixture. It can, alternatively, be viewed as illustrating generically operation of the process in the presence of an adduct of Formula 6, where Z is a tertiary amine. The process can be operated with a broad range of tertiary amines, e.g., triisobutylamine, ethyldipropylamine, diethyloctylamine, diethylcyclohexylamine, methyldicyclohexylamine, tricyclohexylamine, N-ethylpiperidine, and the like.

*Example 2*

(A) A reaction vessel is charged with 25 ml. of 1,11-dimethoxy-3,6,9-trioxaundecane

also called "tetraglyme"] and 2.0 g. of $NaBH_4$. The reaction mixture is stirred under a blanket of nitrogen gas and $B_2H_6$ is bubbled through it at a rate of about 1 g./hr. The mixture is heated slowly and evolution of hydrogen gas begins initially at 106° C. At this temperature evolution of hydrogen gas continues for about 40 minutes and then subsides. A portion of the reaction mixture is removed, cooled and diluted with dioxane. A precipitate forms which is separated and identified as $NaB_3H_8$ containing dioxane as solvent of crystallization.

Heating of the remaining portion of the reaction mixture is continued with passage of $B_2H_6$ and at about 126° C. evolution of hydrogen begins again. A white solid precipitates and, after hydrogen evolution ceases, the solid is separated by filtration to obtain $Na_2B_{12}H_{12}$ containing tetraglyme as solvent of crystallization.

(B) The process of Part A is repeated except that 5.0 g. of $B_2H_6$ is passed through the reaction mixture in 50 minutes at 190° C. A total of 9.0 g. of $Na_2B_{12}H_{12}$ containing tetraglyme as solvent of crystallization is obtained (yield, 49%, based on the $NaBH_4$).

Example 2 illustrates generically operation of the process employing a compound of Formula 2 as one component of the reaction mixture. It can also be viewed as illustrating generically operation of the process in the presence of an adduct of Formula 6, where Z is a saturated hydrocarbyl polyether of Formula 2. The process can be operated with a broad range of polyethers, e.g., $CH_3O(CH_2CH_2O)_3CH_3$, $C_2H_5O(CH_2CH_2O)_4C_2H_5$, $$CH_3O(CH_2CH_2O)_5CH_3$$

and the like.

*Example 3*

A mixture of 2.0 g. of $NaBH_4$ and 25 ml. of di-n-butyl sulfide is blanketed with nitrogen gas, stirred and heated slowly to 195° C. Diborane (8.0 g.) is passed through the mixture over a period of 2 hours and 10 minutes at this temperature. Hydrogen gas is evolved and this gas together with some unreacted diborane passes out of the vessel with the off gases. The reaction mixture is cooled and tetrahydrofuran is added to it. Solids (about 1 g.) are removed from the mixture by filtration. The solid product is washed with fresh tetrahydrofuran, the filtrates are combined and diluted with two volumes of glyme. The white precipitate which forms is separated by filtration to obtain 2.4 g. of $Na_2B_{12}H_{12}$ containing solvent of crystallization (glyme). The solid is dissolved in water, an aqueous solution of CsCl is added and $Cs_2B_{12}H_{12} \cdot CsCl$ precipitates. It is separated by filtration, washed and dried.

The above process is repeated with the exception that no $NaBH_4$ is employed. The only product which is obtained is a yellow oil which contains no salt of the

anion. It is clear, therefore, that the tetrahydroborate is an essential component in the process of the invention to obtain salts of the $B_{12}H_{12}^{-2}$ anion.

Example 3 illustrates generically the operation of the process employing a compound of Formula 3 as one component of the reaction mixture. It can also be viewed as illustrating generically operation of the process in the presence of an adduct of Formula 6 where Z is an organic sulfide. The process is operable with a broad range of organic sulfides, e.g., dihexyl sulfide, methyl octyl sulfide, ethyl cyclohexyl sulfide, dicyclohexyl sulfide, and the like.

The process as illustrated in Examples 1–3 is generically operable with tertiary phosphines. To illustrate, tri-n-propylphosphine or tri-n-butylphosphine can be used in place of di-n-butyl sulfide in Example 3. Other phosphines which can be used include tri-cyclohexylphosphine, tri-n-hexylphosphine, ethyldibutylphosphine, and the like. Due caution should be observed in handling the phosphines in view of their known toxic and flammable properties.

In Examples 1–3, it is noted that the adducts of the liquid media and $B_2H_6$ are prepared directly in the reaction vessel. However, if sufficiently stable, they can be prepared separately and charged into the reaction vessel as needed. To illustrate, diborane and triethylamine can be reacted to form the liquid adduct $(C_2H_5)_3N—BH_3$ which is stored until needed. This modification in the process is illustrated in Example 4.

*Example 4*

A reaction vessel is employed which is fitted with a stirrer, a gas inlet tube, a reflux condenser and an oil bath heater. The vessel is connected to a liquid nitrogen trap which, in turn, is connected to a wet test meter.

The vessel is charged with 20 ml. of borane-triethylamine adduct [$(C_2H_5)_3N—BH_3$, prepared as described earlier], and 2.0 g. of $NaBH_4$. The vessel is evacuated by means of a vacuum pump to a low pressure (less than 1.0 mm. of Hg) and sufficient $B_2H_6$ is passed into the vessel to restore the pressure to 1 atmosphere. The mixture is stirred at atmospheric pressure and heated gradually to 190–205° C. (oil bath temperature). Diborane (0.326 mole) is bubbled slowly through the mixture during this operation for a period of 1.75 hours. The volatile products are passed through the liquid nitrogen trap in which 0.21 mole of $B_2H_6$ condenses and 4.7 liters of noncondensible gas (hydrogen) passes through the wet test meter.

The reaction mixture is cooled to atmospheric temperature (about 25° C.). A small portion of the mixture is filtered to separate the solid product which is $Na_2B_{12}H_{12}$ containing a small quantity of $NaBH_4$. The product is washed with petroleum ether and dried. Its identity is confirmed by its infrared absorption spectrum. The product is completely soluble in a small quantity of water. The product is, therefore, substantially free of

a salt which is highly insoluble in water. The high solubility of the product in water shows clearly that the process yields the sodium salt and that $NaBH_4$ is essential for its formation.

The aqueous solution of $Na_2B_{12}H_{12}$ is mixed with an aqueous solution of $(CH_3)_4NCl$ to form a white precipitate which is $[(CH_3)_4N]_2B_{12}H_{12}$. It is separated by filtration and its identity is confirmed by its infrared absorption spectrum.

The remaining bulk of the reaction mixture is mixed with an equal volume of tetrahydrofuran. A small amount of $NaBH_4$ is removed by filtration. The filtrate is diluted with 2–3 volumes of glyme and the precipitate which forms is separated, washed and dried to obtain 6.0 g. of white crystalline $Na_2B_{12}H_{12}$ containing glyme as solvent of crystallization.

A portion (0.15 g.) of the above sodium salt is dissolved in water and the aqueous solution is passed through a column filled with a commercial acid ion-exchange resin of the crosslinked polystyrenesulfonic acid type. The effluent, which is an aqueous solution of $H_2B_{12}H_{12}$ [or $(H_3O)_2B_{12}H_{12}$], is titrated to a pH of 7 with aqueous 0.1 N NaOH solution of which 5.45 ml. is required. With these data, it is calculated that the conversion of $NaBH_4$ to $Na_2B_{12}H_{12}$ in the process of Example 4, is 40.8% of theory.

The processes of Examples 1–4 are generically operable with alkali metal and alkaline earth metal tetrahydroborates, including, e.g., $LiBH_4$, $KBH_4$, $CsBH_4$, $Mg(BH_4)_2$, $Ca(BH_4)_2$, and $Ba(BH_4)_2$. The lithium, sodium and potassium salts, in particular the last two, are readily available and, therefore, preferred.

It is noted is Example 2, Part A, that $NaB_3H_7$ can be isolated from the reaction mixture as it is heated to the operating temperature of at least 120° C. The mechanism by which the reaction proceeds to the $B_{12}H_{12}^{-2}$ anion is not known but it is common in chemical reactions to pass through a range of intermediate products which vary widely in stability but which lead ultimately to desired products. The data in Example 2, Part A, suggest that the reaction proceeds through the formation initially of an $M(B_3H_8)_n$ compound [where M and $n$ are defined as in Formula 1] and that with further heating in the presence of the Lewis base adduct and with further introduction of $B_2H_6$, the $B_3H_8^{-1}$ anion reacts to form the $B_{12}H_{12}^{-2}$ anion.

One step in the process of the invention may, therefore, be viewed as the reaction of $NaB_3H_8$ (prepared in situ) and an adduct of Formula 6 in the presence of diborane at a temperature of at least 120° C. This mechanism, although not clearly established, is supported by the preparation of the $B_{12}H_{12}^{-2}$ anion directly from $NaB_3H_8$ and a trialkylamine-$BH_3$ adduct which is illustrated as follows:

A reaction vessel is charged with 6.1 g. of $NaB_3H_8$ (containing 3 moles of dioxane of crystallization) and 25 ml. of $(C_2H_5)_3N$—$BH_3$ adduct. The mixture is heated with stirring and forms a clear solution at 117° C. with no evidence of reaction. Heating and stirring is continued and at 138° C. hydrogen begins to be evolved and a solid separates from the mixture. Heating is continued for about 0.5 hour to a maximum temperature of 170° C. The reaction mixture is maintained at 170° C. for another 0.5 hour, i.e., until hydrogen evolution ceases. About 1.0 liter of gas is evolved, i.e., about 2.15 moles of hydrogen per mole of $B_3H_8^{-1}$ anion. The mixture is cooled and the solid is separated by filtration. The filtrate is unchanged $(C_2H_5)_3N$—$BH_3$ adduct and the solid is a mixture of $NaBH_4$ and $Na_2B_{12}H_{12}$ with dioxane of solvation. The mixture is stirred with tetrahydrofuran in which $Na_2B_{12}H_{12}$ is soluble and $NaBH_4$ is insoluble. The mixture is filtered to separate $NaBH_4$ and the filtrate is evaporated to obtain $Na_2B_{12}H_{12}$ with solvent of crystallization (dioxane).

In the above test no $B_2H_6$ is supplied to the reaction mixture during operation of the process. The test is repeated with $B_2H_6$ bubbling through the mixture and the sole product which is obtained and isolated in good yield is $Na_2B_{12}H_{12}$. Sodium trihydroborate ($NaB_3H_8$) when heated alone, i.e., in the absence of $B_2H_6$ and the trialkylamine-borane adduct, will yield $Na_2B_{12}H_{12}$ only when heated for long periods at a high temperature. Thus, $NaB_3H_8$, after heating alone for 8 hours at 100° C. or for 10 hours at 150° C., yielded no $Na_2B_{12}H_{12}$. Only when $NaB_3H_8$ is heated for 10 hours at 200° C. is $Na_2B_{12}H_{12}$ found in the reaction product and it is present in admixture with $NaBH_4$.

Both diborane and the tetrahydroborate contribute to the boron content of the final product. The following illustrations provide further confirmation that each component is needed.

(A) A reaction vessel is charged with 25 ml. of $(C_2H_5)_3N$—$BH_3$ adduct, prepared as described earlier, and 25 ml. of a saturated hydrocarbon of the kerosene boiling range. The mixture is stirred and heated to 180–200° C. Diborane (0.1 mole) is bubbled into the mixture at this temperature over a period of 1.5 hours. Volatile products are formed which include unreacted $B_2H_6$ and possibly a small amount of hydrogen. The reaction mixture is cooled and filtered. There is obtained a small quantity (ca. 0.6 g.) of a white solid which is

$[(C_2H_5)_3NH]_2B_{12}H_{12}$ as shown by its infrared absorption spectrum. The yield is very low. In contrast, the yield of product obtained by the process of the invention and illustrated in the examples is high, demonstrating clearly the need for the presence of a tetrahydroborate in the mixture during reaction at atmospheric pressure.

(B) A reaction vessel is charged with 0.4 g. of $NaBH_4$ and 23 g. of $(C_2H_5)_3N$—$BH_3$, prepared as described earlier. The mixture is stirred and heated at 194–198° C. for 2 hours in the absence of $B_2H_6$. The borane adduct $[(C_2H_5)_3N$—$BH_3]$ is then removed by distillation and the solid residue is examined for $B_{12}H_{12}^{-2}$ anion by infrared analysis and by reaction of an aqueous solution of the residue with an aqueous solution of CsCl. No salt of the $B_{12}H_{12}^{-2}$ anion is detected. This test shows that $B_2H_6$ is a necessary reactant in the process of the invention.

The importance of the Lewis base in obtaining reaction between diborane and the tetrahydroborate at atmospheric pressure by the methods described in Examples 1–4 is demonstrated in the following illustrations:

(C) A horizontal reaction tube is charged with 2.0 g. of $NaBH_4$ and the tetrahydroborate is heated to 200° C. Diborane (2.0 g.) is passed into the tube and over the $NaBH_4$ during a period of 0.5 hour. The exit gases are collected and 0.9 g. of $B_2H_6$ and 0.7 liter of hydrogen are recovered. No $Na_2B_{12}H_{12}$ is isolated; the product in the reactor is $NaBH_4$.

(D) A reaction vessel is charged with 2.0 g. of $NaBH_4$ and 25 ml. of saturated hydrocarbons of the kerosene boiling range. Diborane (2.0 g.) is bubbled through the stirred reaction mixture at 200° C. for 0.5 hour. The volatile products are collected and 1.33 g. of $B_2H_6$ and 1.37 liters of hydrogen are recovered. The solid reaction product is dissolved in water and an aqueous solution of $(CH_3)_4NCl$ is added. No precipitate forms and no $[(CH_3)_4N]_2B_{12}H_{12}$ is obtained. The solid product which is present in the vessel after reaction is principally $NaBH_4$.

It is evident from the above data that the process of the invention, employing a tetrahydroborate (or a trihydroborate formed in situ), diborane and a Lewis base as defined earlier, leads to maximum utilization of the boron components to obtain the desired product (a salt of the $B_{12}H_{12}^{-2}$ anion) in high yield.

The dodecahydrododecarborates obtained in the process of the invention are useful in many fields. They can be used as components of high energy fuels, e.g., rocket propellants, either alone or in combination with oxidizing agents. They can be used as components of compositions for flares and fireworks to impart a pleasing color and sparkle to the display.

The dodecahydrododecarborate salts are converted into the free acid, as described earlier in Example 4, by passage of an aqueous or alcohol solution of an alkali metal or alkaline earth metal salt through a column filled with an acid ion-exchange resin. The acid, which in aqueous solution has the formula $(H_3O)_2B_{12}H_{12}$, is useful in industrial applications, e.g., in absorption of noxious gases from the atmosphere or in situations where one desires to avoid contamination with sulfate, chlorine, bromide, chlorate, phosphate, and like strong acid anions. Thus, traces of lower alkyl amines [e.g., $(CH_3)_3N$] in air can be removed by bubbling the contaminated air through an aqueous solution of $H_2B_{12}H_{12}$. As a further illustration, the acid in aqueous solution is useful for etching metals, such as steel, and for rust removal, for pickling, for scale removal and for similar metal processing operations.

The alkali metal and alkaline earth metal salts of the $B_{12}H_{12}^{-2}$ anion are useful as sequestering agents for metals, especially heavy metals. To illustrate, a mixture of hydrocarbons in the boiling range of gasoline, which contains in solution a copper salt of an organic acid (copper stearate), is thoroughly agitated with an aqueous ammoniacal solution of $Na_2B_{12}H_{12}$. The hydrocarbon layer, which is separated from the aqueous reagent, is completely free of the deleterious copper salt.

The foregoing detailed description has been given for clearness of understanding only and no unnecessary limitations are to be understood therefrom. As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A process for preparing alkali metal and alkaline earth metal dodecahydrododecaborates which comprises reacting
   (a) diborane,
   (b) a tetrahydroborate selected from the class consisting of alkali metal tetrahydroborates and alkaline earth metal tetrahydroborates, and
   (c) a compound selected from those of the formulas consisting of $RO(CH_2CH_2O)_mR'$, $R'SR''$, $RR'R''N$ and $RR'R''P$ wherein R, R' and R'' each are of up to 12 carbon atoms and are selected from the class consisting of alkyl and cycloalkyl, and R' and R'' can be joined together to form a ring with the heteroatom, and wherein $m$ is a cardinal number of from 2 to 6 inclusive,
at a temperature of at least 120° C. in the substantial absence of oxygen and water and at a pressure of about one atmosphere.

2. The process of claim 1 in which the temperature is from 120° C. to 300° C.

3. The process of claim 1 in which the tetrahydroborate is an alkali metal tetrahydroborate.

4. The process of claim 1 in which the tetrahydroborate is an alkaline earth metal tetrahydroborate.

5. The process of claim 3 wherein the aliphatically saturated compound is an organic ether of the formula $RO(CH_2CH_2O)_mR'$ wherein $m$ is a cardinal number of from 2 to 6, inclusive, and R and R' each are selected from the class consisting of alkyl and cycloalkyl of up to 12 carbon atoms.

6. The process of claim 3 wherein the aliphatically saturated compound is a sulfide of the formula $R'SR''$ wherein R' and R'' each are selected from the class consisting of alkyl and cycloalkyl of up to 12 carbon atoms, and R' and R'' can be joined to form a ring with the sulfur.

7. The process of claim 3 wherein the aliphatically saturated compound is a tertiary amine of the formula $RR'R''N$ wherein R, R' and R'' each are selected from the class consisting of alkyl and cycloalkyl of up to 12 carbon atoms, and R' and R'' can be joined to form a ring with the nitrogen.

8. The process of claim 3 wherein the aliphatically saturated compound is a tertiary phosphine of the formula $RR'R''P$ wherein R, R' and R'' each are selected from the class consisting of alkyl and cycloalkyl of up to 12 carbon atoms, and R' and R'' can be joined to form a ring with the phosphorus.

9. The process of claim 1 wherein reactants (a) and (c) are premixed before contacting reactant (b).

10. A process for preparing $Na_2B_{12}H_{12}$ which comprises reacting $B_2H_6$, $NaBH_4$, and $N(C_2H_5)_3$ at a temperature of from 120° C. to 300° C. in the substantial absence of oxygen and water and at a pressure of about one atmosphere.

11. A process for preparing $Na_2B_{12}H_{12}$ which comprises reacting $B_2H_6$, $NaBH_4$ and $CH_3O(CH_2CH_2O)_4CH_3$ at a temperature of from 120° C. to 300° C. in the substantial absence of oxygen and water and at a pressure of about one atmosphere.

12. A process for preparing $Na_2B_{12}H_{12}$ which comprises reacting $B_2H_6$, $NaBH_4$ and $S(C_4H_9)_2$ at a temperature of from 120° C. to 300° C. in the substantial absence of oxygen and water and at a pressure of about one atmosphere.

References Cited

UNITED STATES PATENTS 2,983,574  5/1961  Nigon _____ 23—14

OTHER REFERENCES

Baker et al.: "Journal of Inorganic and Nuclear Chemistry," vol. 23, pp. 41–44 (1961).

MILTON WEISSMAN, *Primary Examiner.*